United States Patent [19]

Melegari

[11] Patent Number: 4,969,677

[45] Date of Patent: Nov. 13, 1990

[54] PIPE PULLING GRIP

[76] Inventor: Douglas M. Melegari, P.O. Box 421, Chatsworth, N.J. 08019

[21] Appl. No.: 390,372

[22] Filed: Aug. 7, 1989

[51] Int. Cl.[5] ................................................ F16L 1/02
[52] U.S. Cl. .................................. 294/86.42; 405/174; 405/184
[58] Field of Search ............... 405/184, 174, 175, 176, 405/154; 254/134.3, 29 R; 294/86.42

[56] References Cited

U.S. PATENT DOCUMENTS

| | | | |
|---|---|---|---|
| 2,249,119 | 7/1941 | DiPalma | 294/86.42 |
| 3,137,765 | 6/1964 | Lanum | 254/134.3 R X |
| 3,760,595 | 9/1973 | Stewart et al. | 405/184 |
| 4,685,832 | 8/1987 | Decker | 405/184 |

Primary Examiner—Dennis L. Taylor
Attorney, Agent, or Firm—Michael B. Einschlag

[57] ABSTRACT

A pipe pulling grip for use, for example, in pulling irrigation pipe underground includes a chain, a tapered nose cone, a hollow pipe, and a pipe grip. The chain is affixed to the tapered portion of the nose cone and the other end of the nose cone is affixed to one end of the pipe. Lastly, one end of the pipe grip is affixed inside the pipe.

8 Claims, 1 Drawing Sheet

4,969,677

PIPE PULLING GRIP

BACKGROUND OF THE INVENTION

1. Field of the Invention

The present invention pertains to a pipe pulling grip and, in particular, to a pipe pulling grip for use in pulling underground irrigation pipes.

2. Description of the Prior Art

At present, several different types of pipe pulling grips are commercially available in the market. FIG. 1 shows an example of such a prior art pipe pulling grip which is comprised of multi-weave, galvanized steel, mesh grip 200 and rotating eye 210. Rotating eye 210 turns to relieve pulling torque when tension on hoop 150 is relieved and this enables the user to readily withdraw pipe from the grip at the end of a pulling session. In a typical grip of the type shown in FIG. 1, rotating eye 210 is comprised of forged steel. Further, pipe pulling grips of the type shown in FIG. 1 are commercially available from, for example, Kellems, Inc. of Stonington, Conn. or from Economy Cable Grips of South Norwalk, Conn.

However, several problems occur when pipe pulling grips of the type shown in FIG. 1 are used to pull PVC pipe or polypropolene pipe to install underground irrigation systems. One problem which occurs is that such grips wear out rapidly, for example, on the average of once every two weeks, and have to be replaced, at great expense. Another problem which occurs is that time and effort must be expended to sea? the opening at the end of the pipe which is inserted into the grip to prevent outside contamination from entering therein. Still another problem which occurs is that valve wires are sometimes damaged when they are pulled along with a main irrigation line.

As a result of these problems, there is a need in the art for a pipe pulling grip which: (a) is sturdy and does not wear out rapidly when used underground; (b) eliminates the need to seal the pipe opening against outside contamination when used underground; (c) provides a relatively large, smooth, compacted boring for the pipe to follow when used underground --which boring reduces friction and, thereby, permits longer and larger pipe pulls; and (d) can be used to pull all types of pipe, including PVC pipe and polypropolene pipe.

SUMMARY OF THE INVENTION

An embodiment of the present invention comprises a pipe pulling grip which: (a) is sturdy and does not wear out rapidly when used underground; (b) eliminates the need to seal the pipe opening against outside contamination when used underground; (c) provides a relatively large, smooth, compacted boring for the pipe to follow when used underground—which boring reduces friction and, thereby, permits longer and larger pipe pulls; and (d) can be used to pull all types of pipe, including PVC pipe and polypropolene pipe. In particular, embodiments of the present invention comprise a tapered nose cone which is affixed to a body having a cavity disposed therewithin; a pipe grip, one end of which pipe grip extends into the cavity; and means for affixing the one end of the pipe grip in the cavity.

In preferred embodiments of the present invention: the tapered nose cone is comprised of solid steel; the body has a cylindrical outer shape and is, for example, a pipe; the pipe grip is a multi-weave, galvanized steel, mesh grip having a rotating eye; and the means for affixing one end of the pipe grip in the cavity is a steel pin which extends transversely through the cavity and the rotating eye. Further, a high alloy, abrasion-resistant chain is affixed to the tip of the tapered nose cone for pulling.

The preferred embodiment of the inventive pipe pulling grip is preferably used by inserting a pipe-to-be-pulled far enough into the mesh grip so that the opening extends into the cavity and is thereby protected from outside contamination by the cylindrical body. As one can readily appreciate, this eliminates the need to seal the opening. Further, since a portion of the mesh grip is mounted inside the cylindrical body, the mesh grip has a longer life when compared to mesh grips which are not used in accordance with the present invention. Still further, the rotating eye can be turned to relieve pulling torque when tension on the mesh grip is relaxed. This is advantageous because it enables the user to readily withdraw the pipe from the grip at the end of a pull.

In addition, preferred embodiments of the present invention, the outside diameter of the larger portion of the tapered nose cone is larger than the outside diameter of the pipe-to-be-pulled. As one can readily appreciate from this, as the inventive pipe pulling grip is pulled underground, the tapered nose cone provides a large, smooth, compacted bore in which the pipe-to-be-pulled travels. As a result, friction between the pipe-to-be-pulled and the bore is reduced and one is able, thereby, to make longer pulls and to pull larger pipe.

DESCRIPTION OF THE DRAWINGS

The novel features that are considered characteristic of the present invention are set forth with particularity herein, both as to their organization and method of operation, together with other objects and advantages thereof, and will be best understood from the following description of the illustrated embodiments when read in connection with the accompanying drawings wherein:

FIG. 1 shows, in pictorial form, a pipe pulling grip in the prior art; an

DETAILED DESCRIPTION

Figure 1:
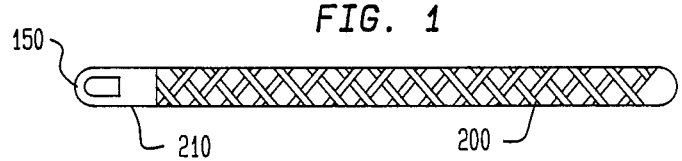
Figure 2:
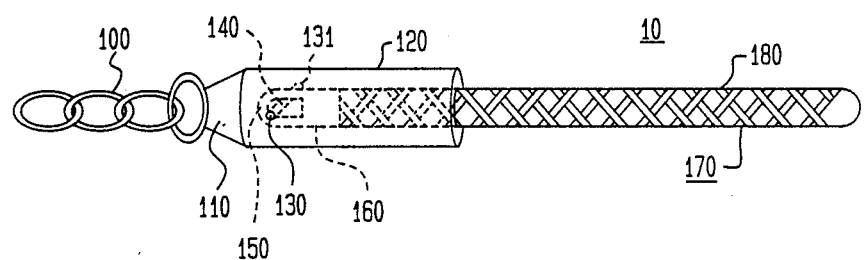
FIG. 2 shows, in pictorial form, an embodiment of the inventive pipe pulling grip.

FIG. 2 shows, in pictorial form, inventive pipe pulling grip 10. As shown in FIG. 2, pipe pulling grip 10 is comprised of high alloy, abrasion-resistant chain 100 which is welded to the tip of solid steel nose cone 110. It is not required that nose cone 110 be solid, however, in a preferred embodiment, nose cone 110 is made solid to provide a sturdy member for absorbing the impact of the earth as apparatus 10 is used to pull pipe underground.

Nose cone 110 is affixed to cylindrical body 120 which has a hollow portion disposed therewithin. In the embodiment shown in FIG. 2, body 120 is a hollow steel pipe and is welded to nose cone 110. Apertures 130 and 131 are disposed in opposite sides of body 120 and a pin, i.e., pin means 140, is inserted through apertures 130 and 131 so that a portion of pin means 140 is transversely disposed within the cavity or hollow portion of body 120. Pin means 140 is secured in the sidewall of body 120, for example, by a force fit.

Multi-weave, galvanized steel, mesh grip 170 is inserted into the hollow portion or cavity in body 120 and pin means 140 is inserted through hoop 150 of rotating eye 160. A grip like multi-weave, galvanized steel, mesh grip 170 is commercially available from, for example, Kellems, Inc. of Stonington, Conn. or from Economy Cable Grips of South Norwalk, Conn. In a preferred embodiment of the present invention, the hollow portion of body 120 is long enough and pin means 140 is disposed so that at least a portion of mesh 180 of grip 170 is disposed within the hollow portion of body 120. However, at the same time, the hollow portion of body 120 is short enough and pin means 140 is disposed so that at least a portion of mesh 180 of grip 170 is disposed outside of the hollow portion of body 120.

The following briefly describes how apparatus 10 is used to pull underground irrigation pipes easily and speedily. In such a use, a slit is made in the ground and a steel blade is affixed to a plow. The steel blade slices the ground to a depth of approximately twelve inches (12") and the tip of the blade makes a tunnel having a cross section of approximately $1\frac{1}{2}"$ by $2\frac{1}{2}"$. A PVC pipe or a polypropolene pipe is inserted into mesh 180 of grip 170 so that the opening of the pipe is disposed within the hollow portion of body 120. The outer diameter of the end of tapered nose cone 110 which is affixed to body 120 and the outer diameter of body 120 are approximately 2 3/8". Then, apparatus 10 is inserted into the tunnel and pulled along the tunnel by chain 100, the tunnel serving as a guide for pulling apparatus 10.

In this application, the outer diameter of the end of tapered nose cone 110 and the outer diameter of body 120 are larger than the tunnel provided by the blade. As a result, as apparatus 10 is pulled along the tunnel, it provides a large, smooth, compacted boring for the pipe to follow. This reduces friction between the earth and the pipe and allows for longer and larger pipe pulls. Also, the large boring eliminates damaged valve wires when they are pulled along with a main irrigation line. In addition, because nose cone 110 and body 120 eliminate the need to seal the end of the pipe opening against outside contamination, the use of the inventive pipe pulling grip provides a savings in time. Further, because a portion of mesh grip 170 is disposed within the hollow portion of body 120, experience has taught us that they last longer.

In a preferred embodiment, mesh grip 170 is equipped with a forged steel rotating eye 160 which can turn to relieve pulling torque when tension on chain 100 is relieved. This enables the user to readily withdraw the pipe from apparatus 10 at the end of a pull.

Other embodiments of the invention, including additions, subtractions, deletions and other modifications of the preferred disclosed embodiments of the invention will be obvious to those skilled in the art and are within the scope of the following claims. For example, although we have described embodiments of the present invention in the context of pulling pipe for the installation of underground irrigation systems, it should be clear to those of ordinary skill in the art that the present invention in not limited to such applications. In fact, the inventive pipe pulling grip may be used to pull any type of pipe and may even be used to pull wire and the like.

What is claimed is:

1. A pulling grip for a pipe or like shaped object comprises:
    a tapered nose cone which is affixed to a body having a cavity disposed therewithin;
    a grip, wherein a portion of the grip which holds the pipe or like shaped object, including an end, extends into the cavity, the outer profile of the body being larger than the outer profile of the grip and the outer profile of the pipe or like shaped object; and
    means for affixing the one end of the grip in the cavity;
    wherein the cavity and the grip are large enough so that an end of the pipe or like shaped object may be inserted into the grip far enough so that at least the end of the pipe may be disposed within the cavity, whereby the body provides abrasion protection for the grip if it is pulled under the ground and whereby the body protects against debris entering the end of the pipe or like shaped object if it is pulled under the ground.

2. The pulling grip of claim 9 which further comprises means, affixed to the tapered nose cone, for pulling the pulling grip.

3. The pulling grip of claim 9 wherein the body has an outer cylindrical shape.

4. The pulling grip of claim 3 wherein the affixing means is an axle means which is disposed to pass substantially transversely through the cavity.

5. The pulling grip of claim 4 wherein the body is a pipe and the axle is disposed in apertures disposed substantially on opposite sides of the pipe.

6. The pulling grip of claim 5 wherein the grip is a mesh grip.

7. The pulling grip of claim 6 wherein the mesh grip has a hook at one end and the axle is disposed through the hook.

8. The pulling grip of claim 7 wherein the hook is affixed to means which enables the mesh grip to rotate.

* * * * *